(12) United States Patent
Lewis

(10) Patent No.: US 6,854,539 B2
(45) Date of Patent: Feb. 15, 2005

(54) VEHICLE STEERING SYSTEM

(75) Inventor: Ian William Lewis, Bideford-on-Avon (GB)

(73) Assignee: Lewis Equipment Limited (GB)

( * ) Notice: Subject to any disclaimer, the term of this patent is extended or adjusted under 35 U.S.C. 154(b) by 0 days.

(21) Appl. No.: 10/468,695

(22) PCT Filed: Feb. 21, 2002

(86) PCT No.: PCT/GB02/00780

§ 371 (c)(1),
(2), (4) Date: Aug. 21, 2003

(87) PCT Pub. No.: WO02/066311

PCT Pub. Date: Aug. 29, 2002

(65) Prior Publication Data

US 2004/0066009 A1 Apr. 8, 2004

(30) Foreign Application Priority Data

Feb. 21, 2001 (GB) .............................................. 0104257

(51) Int. Cl.⁷ ............................................ B60K 17/356
(52) U.S. Cl. ......................... 180/6.3; 180/242; 180/234
(58) Field of Search ................................ 180/6.2, 6.24, 180/6.26, 6.3, 234, 236, 242

(56) References Cited

U.S. PATENT DOCUMENTS

| 3,351,147 | A | * | 11/1967 | Williamson | 180/6.3 |
|---|---|---|---|---|---|
| 3,841,423 | A | * | 10/1974 | Holtkamp et al. | 180/6.3 |
| 3,900,075 | A | * | 8/1975 | Chichester et al. | 180/6.3 |
| 5,335,739 | A | | 8/1994 | Minne et al. | |
| 5,570,754 | A | | 11/1996 | Stimson | |
| 5,823,284 | A | * | 10/1998 | Hoar et al. | 180/240 |
| 6,230,829 | B1 | * | 5/2001 | Martin et al. | 180/6.3 |

FOREIGN PATENT DOCUMENTS

| DE | 199 18 882 | 12/1999 |
|---|---|---|
| JP | 2000168381 | 6/2000 |

* cited by examiner

Primary Examiner—Kevin Hurley
(74) Attorney, Agent, or Firm—Kilpatrick Stockton LLP

(57) ABSTRACT

A land vehicle has four wheels (10) by which the vehicle is driven and steered and the wheels are driven by hydraulic motors (11). In one arrangement the vehicle is steered by at least one pair of steerable wheels and supply of fluid to the motors is arranged to reduce the speed of a wheel or wheels at one side of the vehicle during turning. The vehicle can also be operated in the skid steer mode with the wheels locked in a straight ahead position.

6 Claims, 5 Drawing Sheets

VEHICLE STEERING SYSTEM

This invention relates to vehicle steering systems and in particular to vehicles having at least two wheels on opposite sides of the vehicle driven hydraulically.

Land vehicles have been proposed incorporating wheels, which are termed skidsteer vehicles by which steering is effected by having differential speeds of the wheels on opposite sides of the vehicle and the wheels are not themselves steerable. Other vehicles have steerable wheels at the front, rear, or both and such wheels may all be driven. These vehicles provide different steering characteristics and a skidsteer vehicle is very manoeuvrable given the appropriate ground conditions. Vehicles with steerable wheels are not so manoeuvrable but do not damage the ground to the extent which may occur with skidsteer vehicles.

An object of the invention is to provide a wheeled vehicle having improved driving characteristics.

According to the invention a land vehicle has at least four wheels by which the vehicle is driven and steered, at least two of the wheels lying at opposite sides of the vehicle and each wheel having hydraulic motor drive means associated therewith by which the associated wheel is drivable in each direction, said two wheels each being selectively steerable to enable the vehicle to travel in the desired direction, and control means whereby hydraulic fluid is fed to the motors to enable the wheel speeds of said two wheels to be adjusted according to the selected direction of travel of the vehicle to rotate the wheels at appropriate different speeds.

Preferably the vehicle has at least two pairs of wheels, one towards the forward end of the vehicle and one towards the opposite end, each wheel of at least one pair having hydraulic motor drive means. Fluid may be fed to the hydraulic drive means on one side of the vehicle by a series connection. The control means may control the fluid flow to the drive means at opposite sides of the vehicle to achieve different wheel speeds according to the steering angle of the steerable wheels by changing the fluid flow to the motor drive means for the wheel or wheels at one side.

The steerable wheels may be moved to steer the vehicle by a mechanical linkage attached to the wheels. Preferably the vehicle is also drivable by operating the vehicle drive as a skidsteer vehicle in which case the wheels are held in the straight ahead position and the drive motors for the wheels at one side of the vehicle are operable at different speed from the drive motors at the other side, so that the vehicle is steered by use of said differential speeds.

Control means may be provided whereby the driving speeds at different sides of the vehicle are co-ordinated and have a common control means such as a steering wheel or a single lever.

Figure 1:
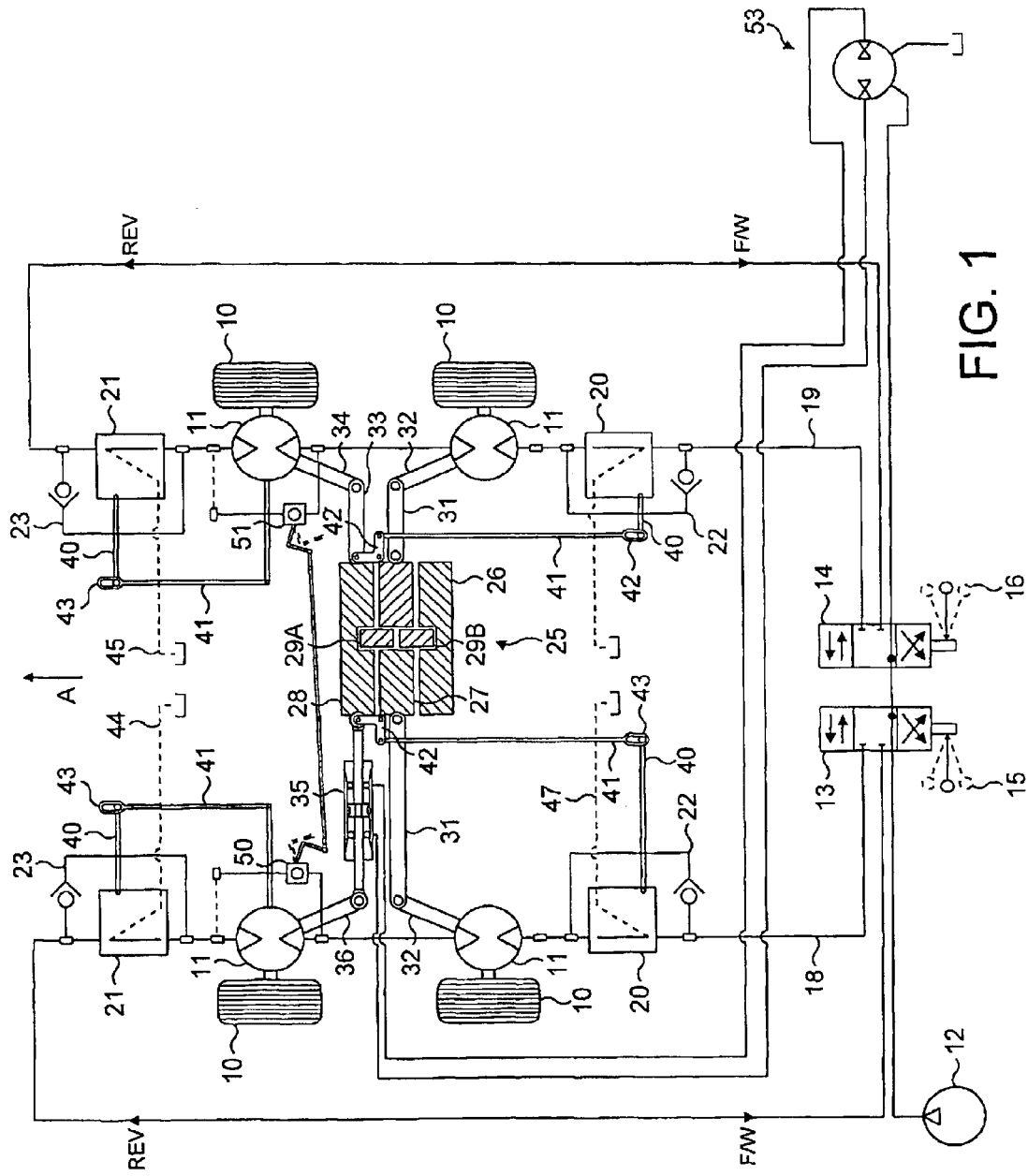
Figure 2:
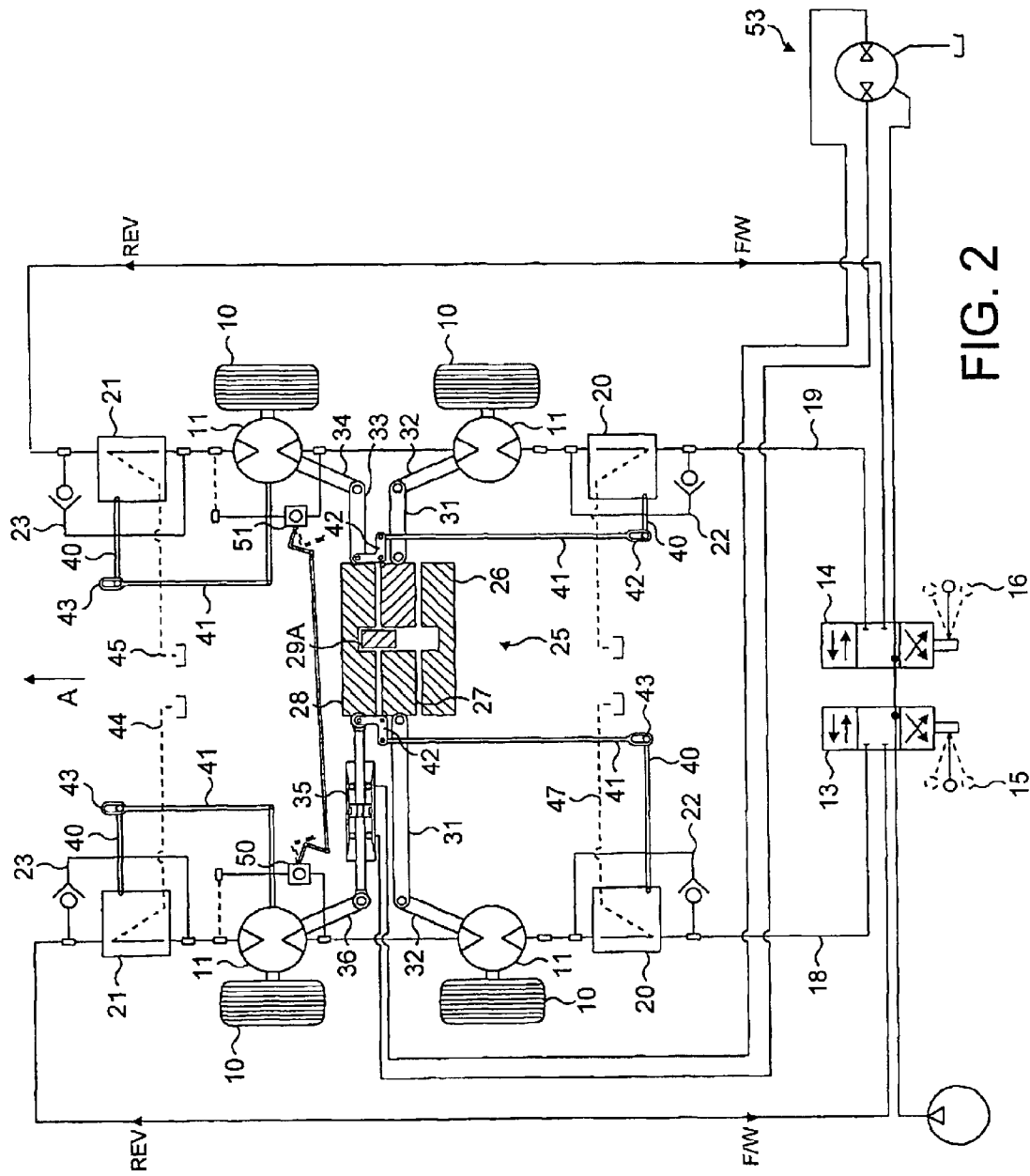
Figure 3:
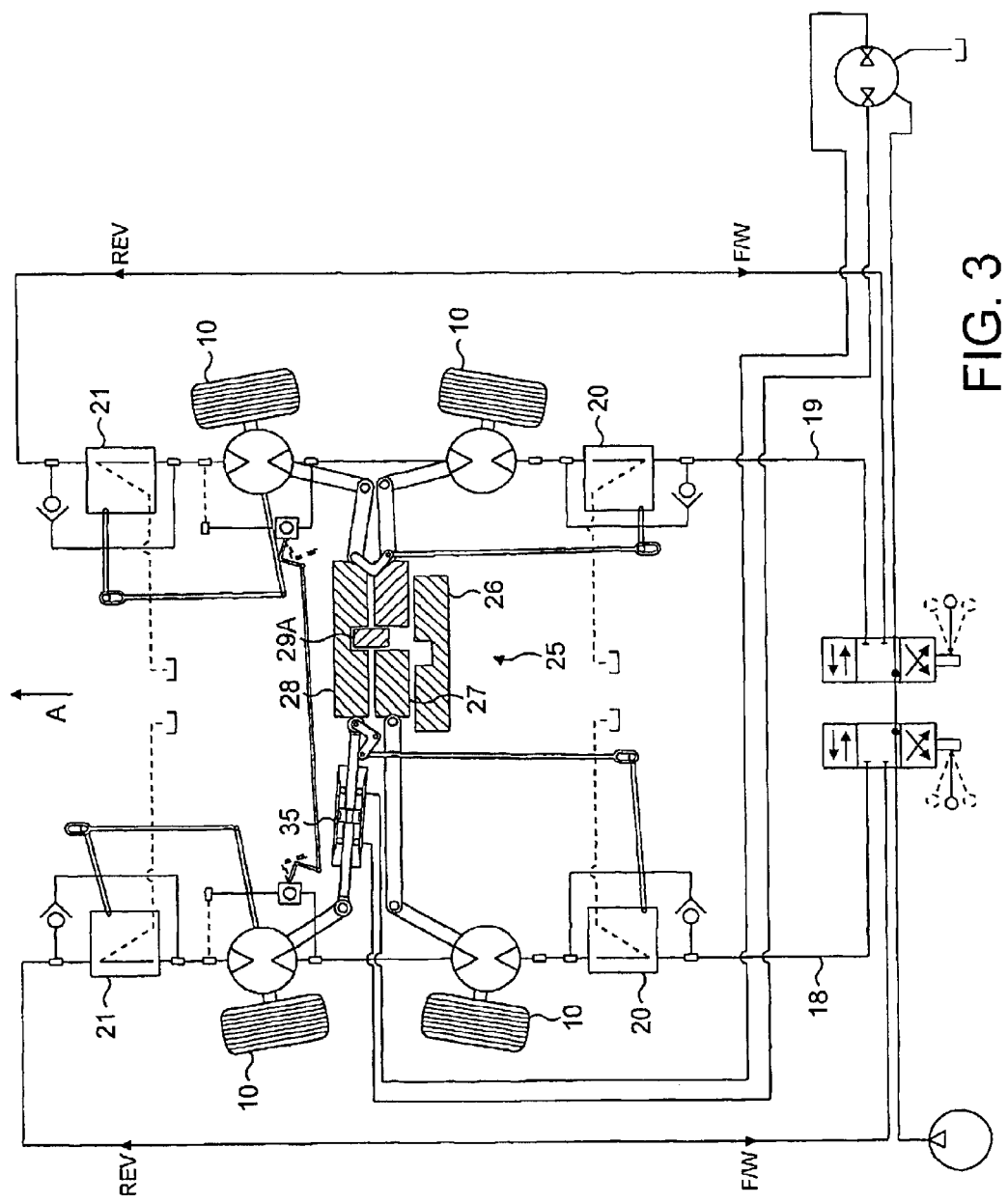
Figure 4:
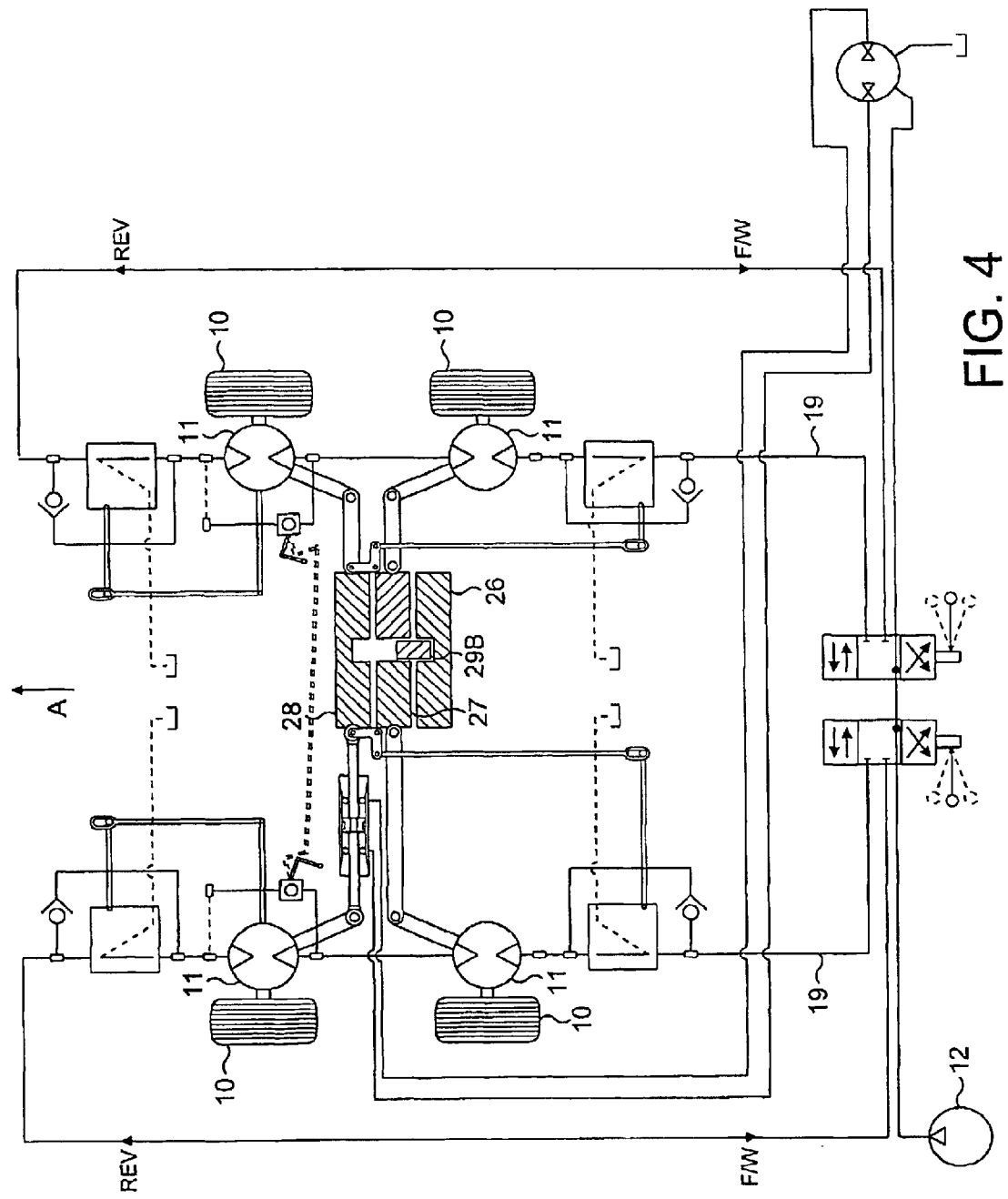
Figure 5:
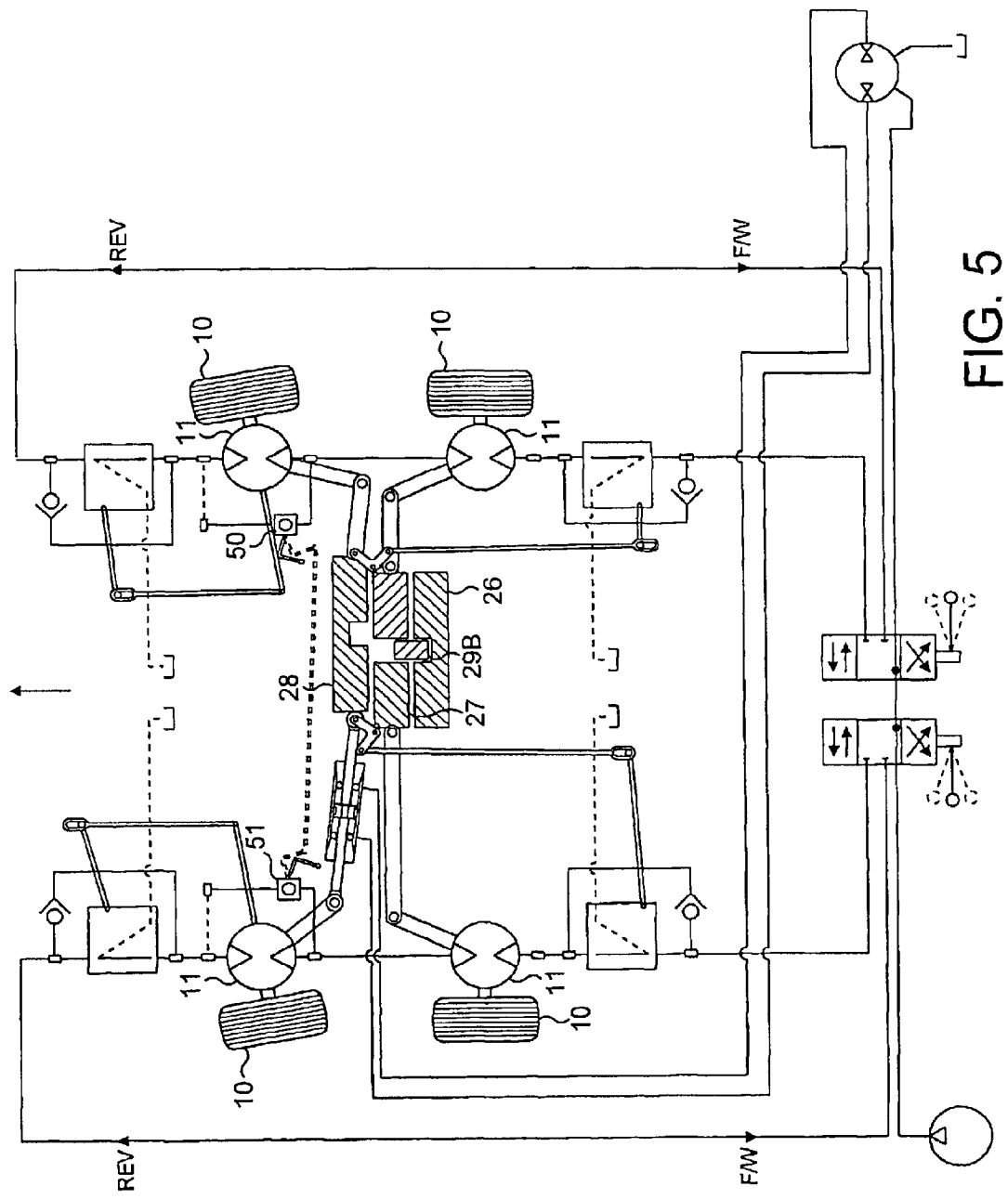

Further features of the invention will appear from the following description of an embodiment of the invention given by way of example only and with reference to the drawings in which:

FIG. 1 is a diagrammatic plan view of a four wheel vehicle in skidsteer mode,

FIG. 2 is a diagrammatic view, corresponding to FIG. 1, of the vehicle in a mode in which all the vehicle wheels can be steered, but shown in a straight ahead position, FIG. 3 is a view corresponding to FIG. 2 with a vehicle in a steering mode and executing a left hand turn, FIG. 4 is a diagrammatic view of the vehicle in a steering mode in which two wheels are steerable, shown in a straight ahead position, and FIG. 5 is a diagrammatic view corresponding to FIG. 4 with the two wheel steering mode, the vehicle making a left hand turn.

Referring to the drawings there is shown a four wheel vehicle which is the same in each case, the drawings differing in the set up for the steering and drive of the vehicle. Thus the vehicle is capable of various modes of operation, usually with all wheels drivable (except for the FIG. 4 and FIG. 5 set up), sometimes with the vehicle wheels driving the vehicle using skidsteer characteristics but also in other modes with the wheels or two of them being steerable to steer the vehicle.

The arrangement is intended to provide a multipurpose vehicle which combines the advantages of skidsteer under certain conditions, with the advantages of steerable wheels under other conditions. Furthermore, under other circumstances the vehicle can be set up so that only two wheels, usually the leading wheels, are steerable. If required, however, it will be seen that not all of these modes of operation may be required and, for example, the vehicle may not be set up for two wheel steering and/or two wheel drive.

In the drawings the same reference numerals are used for the same or similar parts in each Figure. In each case the vehicle has two pairs of wheels 10, a forward set of wheels having regard to the usual direction of travel A, and a rearward set of wheels. Each of the wheels 10 is drivable by an associated motor 11 which is a hydraulically driven motor for which the hydraulic fluid is supplied from a pump 12.

The pump 12 supplies fluid to the motors 11 through spool valves 13 and 14 which control the supply of fluid to the wheels to the left hand side and to the right hand side of the vehicle respectively. The spool valves 13 and 14 are controlled by levers 15 and 16 or by other actuators, as required. Fluid is supplied to the left hand wheel motors 11 through a fluid line 18 which passes in series to the left hand wheel motors. Fluid can travel in either direction along the line 18 depending upon whether the wheels are to rotate in the forward or reverse direction. Similarly a fluid line 19 takes fluid in series to the right hand wheel motors 11 in either direction.

Each of the fluid lines 18 and 19 has fluid divider means 20 and 21 associated with each of the respective drive motors 11 whereby to direct a selected amount of fluid away from the associated motor to reduce the fluid flow through said motor, when required, the divider means being shown at 20 and 21. The divider means comes into operation only when the vehicle is in its steerable wheels mode as will be described in relation to FIG. 3 and the amount of fluid not passed to the associated motor depends on the steering action selected. Fluid diverted from the motor 11 is passed to a fluid reservoir or to the motor circuit at the opposite side of the vehicle.

Each of the circuits 18 and 19 also have one-way valve arrangements associated with each divider means 20, 21, the valve means being shown at 22, 23 for each of the motors, the one-way valve means being arranged to enable the fluid to bypass the divider means 20, 21 depending upon the direction of flow of fluid in the circuit.

The vehicle is also provided with means for steering the pairs of wheels or a selected pair of wheels and for locking the wheels in a fixed, straight ahead position, such as shown in FIG. 1. Means is provided for locking the steerable wheels in the straight ahead position is shown at 25 and includes a fixed member 26 which is fixed in relation to the vehicle chassis. There are two movable members 27 and 28 of which one 27 is movable when the rear wheels 10 are made to be steerable and the other member 28 is movable when the front wheels 10 are made to be steerable. If both pairs of wheels are made to be steerable then both members 27 and 28 are movable together as seen in FIG. 3. FIG. 1 shows the members 27, 28 fixed by fixing means 29a and 29b in relation to the fixed member 26. In FIG. 2 the movable members 27, 28 are fixed in relation to each other by fixing means 29a but are movable in relation to the fixed member 26 but, as shown, the movable members 27, 28 are located in position for the vehicle to go in a straight line. In FIG. 3 the movable members 27, 28, being fixed for movement together by the element 29a are moved to the right, as shown, to achieve steering movement of all four wheels for a left hand turn. In FIG. 4 the element 29b fixes the movable member 27 in relation to the fixed member 26 whereby only the movable member 28 can move thereby to effect steering of the front pair of wheels only. As shown in FIG. 4 no steering movement has taken place. In FIG. 5 a movement of the member 28 has taken place to the right, as seen, to effect a left hand steering mode of the wheels 10 at the front of the vehicle.

The moveable members 27, 28 are each coupled to linkages to effect steering movement of the wheels 10, when required. In the case of the moveable member 27 arranged to operate steering of the rear pair of wheels 10, there are two interconnected links 31, 32 for each wheel 10 whereby movement of the member 27 to the left or to the right effects a steering movement of the associated wheels 10.

For the front pair of wheels 10 the moveable member 28 effects a steering movement of the pair of wheels 10 when moved to the left or to the right as seen in the drawings, through a pair of linkages 33, 34 to the right front wheel and through a piston and cylinder 35 and a link 36 to the left hand front wheel 10. The piston and cylinder 35 is the drive means for the steering movement of all or some of the wheels depending on the set up of the vehicle. Thus extension of the ram 35 urges the moveable member 28 to move which causes a steering motion of the front set of wheels and, when the member 28 is coupled to the member 27 by the element 29a, operation of the ram 35 also causes a simultaneous corresponding movement of the movable member 27 to thereby effect a steering movement of the rear wheels 10 at the same time.

As shown, the cylinder 35 is arranged to steer all the wheels. Instead there may be a cylinder for each of the two pairs of wheels, i.e. one for the front wheels and one for the rear wheels. Alternatively there may be a cylinder for each wheel, control of which is coordinated so that the cylinders move the associated wheels in a steering mode by the required amount.

Instead of there being locking means as described for locking the steerable wheels in a straight ahead position for skidsteer operation the wheels may be locked by the cylinder or cylinders holding the wheels in a straight ahead position.

There is also incorporated into the steering linkage arrangement control means for operating the dividers 20 and 21. The dividers 20, 21 only come into operation when the vehicle is in the mode shown in FIG. 3 and FIG. 5, i.e. when the wheels 10 are steerable and the vehicle is making a turn. In this case it is desired that the wheels on the inside of the turn travel at a lower speed than the wheels at the outside of the turn. This function is normally provided by differential means between the pairs of wheels. In the illustrated vehicle this is provided by the divider means 20, 21. Through control links 40, 41 and 42 movement of the piston and cylinder 35 is transmitted to the divider means 20 at the rear end of the vehicle and the divider means 21 at the front of the vehicle. The links 40 and 41 are interconnected by a slotted connection 43 and the link 42 is a crank connected at one end for movement with the piston and cylinder 35 and at the other end to the link 41.

Upon movement of the moveable members 27, 28 the link assemblies 40, 41, 42 and 43 for each wheel will divert fluid from the motors for the wheels associated with the four dividers 20 and 21 according to the steering direction whereby fluid will be diverted from the wheel motors 11 on the inside of the turn to storage means, as shown, or towards the wheel motors at the outside of the turn, whereby the wheels at the outside of the turn will be rotated faster than the wheel motors at the inside of the turn. Although FIG. 3 and the drawings shows a left hand turn it will be obvious that the vehicle can make turns in either direction of turn and in either direction of travel and the divider means will accommodate the differences in wheel speeds required. The arrangement of series supply of fluid to each of the hydraulic motors at each side of the vehicle is an advantageous feature and the provision of the divider means during a turn accommodates a problem which would otherwise arise due to all the wheels rotating at the same speed during a turning movement when the wheels are steerable.

When the vehicle is in skidsteer mode, as shown in FIG. 1, the steering system utilising the steering links, ram 35 and dividers 20, 21 are not operable. Instead the fluid supply to each of the wheels at one side of the vehicle is controlled in relation to the fluid supply to the motors on the other side of the vehicle. In this way the wheels at the opposite sides of the vehicle have their speeds controlled in order to achieve a steering action. Thus the wheels at one side travel at a slower speed in the same direction as the wheels at the other side or the wheels at one side rotate in the opposite direction or be stationery compared with the wheels at the other side in order to obtain a steering action. This kind of steering, known as skidsteer is very satisfactory if high manoeuvrability of the vehicle is required and the vehicle can execute a complete 360° turn without moving forwards or backwards, if required. However skidsteer vehicles are unsatisfactory in some circumstances because they tend to cause more damage to the ground over which the vehicle is travelling as the wheels scrub through the ground during steering actions. To overcome this the wheels may selectively be made steerable utilising the ram 35 to effect steering of all the wheels, FIG. 3, or only two of the wheels (the front wheels) FIG. 5. This steering arrangement provides less manoeuvrability but is not so damaging to the ground over which the vehicle is travelling. As mentioned previously the use of differential speeds for the wheels on the inside and outsides of the turn assist in effecting good steering characteristics and do less damage to the ground.

As further features it is seen that the slotted connection 43 between the links 40 and 41 permits a steering movement in one direction which does not result in operation of the divider means, operation of which only takes place in the opposite direction. There is also provided ball valves 50 and 51 moveable between open and closed positions which are located in a fluid line extending between diverter fluid lines 44 and 45 of the front wheels and the main fluid lines 18 and 19. Opening and closing of the ball valves 50 and 51 permit fluid to pass between these lines to disengage drive to the front wheels in the two wheel steering mode of FIGS. 4 and 5.

When the vehicle is in a steerable wheels mode of FIGS. 2 to 5 a steering motor 53 or spool valve is employed which controls the flow of fluid to the ram 35 or rams.

What is claimed is:

1. A land vehicle having at least two pairs of wheels by which the vehicle is driven and steered, wheels in each pair lying at opposite sides of the vehicle, at least one of the pairs of wheels having a hydraulically operated motor associated with each wheel within the pair by which the associated wheel is driveable in each direction, the wheels being selectively steerable to enable the vehicle to travel in the desired direction, and control means whereby hydraulic fluid is fed through the motors to enable the wheel speeds of the wheels in said pair to be adjusted according to the selected direction of travel of the vehicle to rotate the wheels at different speeds, wherein the motors are arranged to have variable speed by adjusting the flow of fluid thereto, the wheels being steerable by a mechanical linkage movement of which controls the flow of fluid to the associated motors by the use of fluid flow dividers.

2. A vehicle according to claim 1 wherein the flow divider increases or reduces the amount of fluid passing to the motors to increase or reduce the motor speed and the associated wheel speed during turning of the vehicle.

3. A vehicle according to claim 1 in which both pairs of wheels are steerable and, for each pair, the wheels are driveable at different speeds during a turning movement of the vehicle by adjusting the flow of fluid, using the flow dividers, to the motors whereby driving them at different speeds.

4. A vehicle according to claim 1 which the vehicle wheels are lockable in a straight ahead vehicle travel position.

5. A vehicle according to claim 4 wherein the wheels in each pair are driveable at different speeds by the associated motors to effect a steering action on the vehicle when the wheels are locked in the straight ahead position.

6. A vehicle according to claim 1 wherein the wheels of each pair which lie at the same side of the vehicle are associated with motors which are fed by hydraulic fluid in a series connection, said control means being arranged to provide different flows of fluid to opposite sides of the vehicle.

* * * * *